(12) United States Patent
Mohammad et al.

(10) Patent No.: US 12,358,815 B1
(45) Date of Patent: Jul. 15, 2025

(54) METHOD AND SYSTEM FOR SUSTAINABLE BRINE TREATMENT AND HEAVY METAL PURIFICATION USING RECYCLED CARBON FIBER

(71) Applicant: United Arab Emirates University, Al Ain (AE)

(72) Inventors: Ameera Mohammad, Al Ain (AE); Salem Alzahmi, Al Ain (AE); Fatemeh Bahaeddin, Al Ain (AE); Waleed Ahmed, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/936,404

(22) Filed: Nov. 4, 2024

Related U.S. Application Data

(62) Division of application No. 18/595,901, filed on Mar. 5, 2024, now Pat. No. 12,168,615.

(51) Int. Cl.
*C02F 1/28* (2023.01)
*B01D 53/04* (2006.01)
*B01D 53/10* (2006.01)
*C02F 1/26* (2023.01)
*C02F 1/62* (2023.01)
*C02F 101/20* (2006.01)

(52) U.S. Cl.
CPC ............. *C02F 1/283* (2013.01); *B01D 53/04* (2013.01); *B01D 53/10* (2013.01); *C02F 1/265* (2013.01); *C02F 1/62* (2013.01); *B01D 2253/102* (2013.01); *B01D 2253/304* (2013.01); *B01D 2257/504* (2013.01); *C02F 2101/20* (2013.01); *C02F 2303/16* (2013.01)

(58) Field of Classification Search
CPC .. C02F 1/283; C02F 1/265; C02F 1/62; C02F 2101/20; C02F 2303/16; B01D 53/04; B01D 53/10; B01D 2253/102; B01D 2253/304; B01D 2257/504
See application file for complete search history.

(56) References Cited

PUBLICATIONS

Baati et al., "Molecular community analysis of magnesium-rich bittern brine recovered from a Tunisian solar saltern", Can. J. Microbiol., 2011, vol. 57, pp. 975-981.
(Continued)

*Primary Examiner* — John Kim
(74) *Attorney, Agent, or Firm* — MH2 Technology Law Group, LLP

(57) ABSTRACT

There is disclosed a method and system for utilizing carbon fibres for purification of rejected brine solution comprising thermally recycling carbon fibres and mechanically reducing the recycled carbon fibres, employing a chemical surface activation process for the reduced carbon fibres, resulting in chemically activated recycled carbon fibres; and exposing the activated recycled carbon fibres along with the brine solution to $CO_2$ gas, resulting in the activated recycled carbon fibres selectively recovering contaminants from the brine solution, wherein adsorption of $CO_2$ molecules is also performed by the activated recycled carbon fibres during the recovery. The thermal recycling of carbon fibres is done via pyrolysis and a G-S-L contact system assists in exposing the activated carbon fibres along with the brine solution to $CO_2$ gas at varying flow rates and contact times for recovering contaminants from the brine solution.

5 Claims, 9 Drawing Sheets

(56) References Cited

PUBLICATIONS

Cambridge et al., "Effects of high salinity from desalination brine on growth, photosynthesis, water relations and osmolyte concentrations of seagrass *Posidonia australis*", Marine Pollution Bulletin (2016), 9 pages. http://dx.doi.org/10.1016/j.marpolbul.2016.11.066.

Dong et al., "Forming Mechanism and Morphology of CaSO4 • H2O by SEM-EDS and ICP", Journal of Wuhan University of Technology-Mater Sci. Ed., vol. 31, No. 2, Apr. 2016, 4 pages.

Gerard et al., "Effect of calcium based additives on the sodium bicarbonate crystallization in a MSMPR reactor", Powder Technology, vol. 255, (2014) pp. 134-140.

Jones et al., "The state of desalination and brine production: A global outlook", Science of the Total Environment, vol. 657, (2019), pp. 1343-1356.

König et al., "Brine wastewater pretreatment using clay minerals and organoclays as flocculants", Applied Clay Science, vol. 67-68, (2012), pp. 119-124.

Lei et al., "Carbon membranes for CO2 removal: Status and perspectives from materials to processes", Chemical Engineering Journal, vol. 401, (2020), 17 pages.

Li et al., "Nitrogen-enriched porous polyacrylonitrile based carbon fibers for CO2 capture", Ind. Eng. Chem. Res., Jul. 31, 2018, 29 pages.

Mavukkandy et al., "Brine management in desalination industry: From waste to resources generation", Desalination, vol. 472, (2019), 18 pages.

Mohamed et al., "Impact of land disposal of reject brine from desalination plants on soil and groundwater", Desalination, vol. 182, (2005), pp. 411-433.

Omole et al., "Effects of CO2 on a High Performance Hollow-Fiber Membrane for Natural Gas Purification", Ind. Eng. Chem. Res., 2010, vol. 49, pp. 4887-4896.

Pimenta et al., "Recycling carbon fibre reinforced polymers for structural applications: Technology review and market outlook", Waste Management, vol. 31, (2011), pp. 378-392.

Sanmartino et al., "Treatment of reverse osmosis brine by direct contact membrane distillation: Chemical pretreatment approach", Desalination, vol. 420, (2017), pp. 79-90.

Semblante et. al., "Brine pre-treatment technologies for zero liquid discharge systems", Desalination, vol. 441 (2018), pp. 96-111.

Shen et al., "Hierarchical porous polyacrylonitrile-based activated carbon fibers for CO2 capture", J. Mater. Chem., 2011, vol. 21, 6 pages.

Sun et al., "Recycling of carbon fibers from carbon fiber reinforced polymer using electrochemical method", Composites: Part A, vol. 78, (2015) pp. 10-17.

Wang et al., "Nitrogen-containing activated carbon fibers derived from silk fibers for CO2 capture", Materials Letters, vol. 152, (2015), pp. 145-147.

Wang et al., "Effects of alkali-treated recycled carbon fiber on the strength and free drying shrinkage of cementitious mortar", Journal of Cleaner Production (2019), 23 pages. doi: https://doi.org/10.1016/j.jclepro.2019.04.295.

Xu et al., "Surface modification of carbon fiber support by ferrous oxalate for biofilm wastewater treatment system", Journal of Cleaner Production, vol. 194, (2018), pp. 416-424.

Morin et al., "Near- and super critical solvolysis of carbon fibre reinforced polymers (CFRPs) for recycling carbon fibers as a valuable resource: State of the art", Journal of Super critical Fluids, 2012, vol. 66, pp. 232-240. 10.1016/j.supflu.2012.02.001.hal-00695025.

Piñero-Hernanz et al., "Chemical recycling of carbon fibre reinforced composites in nearcritical and supercritical water", Composites: Part A, vol. 39, (2008), pp. 454-461.

METHOD AND SYSTEM FOR SUSTAINABLE BRINE TREATMENT AND HEAVY METAL PURIFICATION USING RECYCLED CARBON FIBER

CROSS-REFERENCE TO RELATED APPLICATIONS

This application is a Divisional of U.S. application Ser. No. 18/595,901 filed 5 Mar. 2024, now U.S. Pat. No. 12,168,615, the entire disclosure of which is incorporated herein by reference.

FIELD OF THE INVENTION

The present invention relates to the field of carbon waste utilization and $CO_2$ capture, and more particularly to sustainable brine treatment and heavy metal purification using recycled carbon fiber.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Brine production, primarily associated with desalination processes on a global scale, represents a significant environmental challenge alongside other industries such as salt dome solution mining, oil extraction and potash mining. While desalination is a key solution to freshwater scarcity, it produces brine as a by-product characterized by increased salinity. This by-product is known to contain hazardous substances, highlighting the environmental concerns associated with its production. Brine, characterized by its high salt content, is a by-product of various industrial processes, with desalination methods such as multi-stage flash (MSF) and reverse osmosis (RO) being prominent contributors. The global daily production of brine is significant (142 million cubic metres per day) and poses significant environmental challenges. Regions with particularly high concentrations of brine production include Saudi Arabia, the UAE, Kuwait and Qatar, which together account for 55% of global brine production. In addition to desalination, brine is produced from alternative sources, further contributing to its global spread. Solution mining of salt domes for hydrocarbon storage and salt pond processes are notable examples. The latter produces a by-product known as bittern brine, which is either discharged into the sea or processed for alternative salt production.

Scientific studies emphasize the profound impact of even indirect variations in temperature and salinity on marine ecosystems. The disruption of the osmotic equilibrium caused by increased salinity in the brine can lead to cellular dehydration, reduced turgor pressure and potential mortality in marine species. These ecological effects highlight the importance of understanding and mitigating the environmental impacts of brine discharges. In the context of regions such as the UAE, desalination plants play a vital role in meeting the demand for potable water, making a significant contribution by providing 42% of the water supply and collectively generating 14% of the world's brine. While addressing the challenges of water scarcity, the disposal of brine from desalination processes presents multiple challenges from both an economic and environmental perspective. The sheer volume and composition of brine, coupled with the potential damage it can cause to marine ecosystems, requires a comprehensive reassessment of its status—from being perceived as waste to being recognized as a valuable resource. The environmental impact of brine production goes beyond its chemical composition. The discharge of brine into aquatic ecosystems can disrupt the delicate balance of the marine environment, affecting flora and fauna.

Elevated salinity levels can lead to changes in the osmoregulatory processes of marine organisms, with potential adverse effects on their physiology and reproductive capacity. In addition, the introduction of hazardous substances present in brine can have long-lasting effects on the health of marine ecosystems, with cascading effects on biodiversity. Brine disposal presents a number of unique challenges. Economically, the costs associated with transporting and responsibly disposing of large volumes of brine can be significant. Environmentally, the release of brine into natural water bodies can cause localised ecological disruption, impacting on aquatic life and, in some cases, affecting the quality of drinking water sources. In addition, the cumulative effect of brine discharges from multiple sources requires a comprehensive strategy for sustainable management. A paradigm shift is needed to address the challenges posed by brine production. Rather than viewing brine as a problematic waste stream, there is a growing need to recognise it as a valuable resource that can be recycled and used in various applications. This shift in perspective opens up opportunities for innovative and sustainable approaches to brine management, including the development of brine treatment technologies, resource recovery and the integration of brine into circular economy practices.

Carbon fiber reinforced plastic (CFRP) composites have attracted considerable attention due to their exceptional properties, including robustness, large surface area and corrosion resistance. The global demand for carbon fibers has experienced a notable surge in recent years (driven by the expanding applications and the constant quest for materials with enhanced performance characteristics), with global consumption estimated at 35,000 tons in 2008 and showcasing an impressive annual growth rate exceeding 12%. The robust nature of CFRP composites stems from the combination of carbon fibers and a plastic resin matrix, resulting in a material with high strength-to-weight ratio and superior mechanical properties. This makes CFRP composites ideal for a diverse range of applications, including aerospace components, automotive parts, sporting goods, and infrastructure components. The extensive surface area of carbon fibers enhances their strength and stiffness, making them sought-after materials in industries requiring lightweight and high-performance solutions. The estimated consumption figures signify the growing reliance on carbon fibers in various industries, reflecting a trend towards advanced materials that offer a balance between strength, weight, and durability.

Efficient management of CFRP composites at the end of their life cycle is crucial for sustainability and resource conservation. The recycling landscape for carbon fibers involves distinct technologies, each addressing specific aspects of material recovery and reuse. Mechanical recycling entails the physical breakdown of carbon fibers through processes such as crushing, milling, and shredding. This results in fibers with lengths typically around 10 mm. While mechanical recycling offers a straightforward approach, challenges may arise in maintaining the mechanical properties of the fibers during the process. Careful consideration of fiber length and alignment is essential to ensure the recycled material meets the required specifications for subsequent applications. Thermal recycling, the second technology, employs heat to dismantle scrap CFRP composites and incinerate the resin matrix. This process facilitates the recovery of carbon fibers, which can then be reused in new composite materials. Thermal recycling is advantageous in terms of achieving high-purity fibers, but careful control of the temperature and heating process is necessary to prevent degradation of the carbon fibers.

Accordingly, there exists a need for a better solution for sustainable brine treatment, to reduce salinity and purify heavy metals and an alternative approach to recover carbon fibers used for the same.

SUMMARY OF THE INVENTION

Therefore it is an object of the present invention to propose a better solution for sustainable brine treatment, to reduce salinity and purify heavy metals and an alternative approach to recover carbon fibers used for the same.

There is disclosed a method of reducing salinity of brine, the method comprising the steps of thermally recycling carbon fibers and mechanically reducing the recycled carbon fibers, employing a chemical surface activation process for the mechanically reduced carbon fibers, resulting in chemically activated recycled carbon fibers; and exposing the chemically activated recycled carbon fibers along with the brine solution to $CO_2$ gas, resulting in the chemically activated recycled carbon fibers selectively recovering contaminants or salts from the brine solution, wherein capturing/adsorption of $CO_2$ molecules is also performed by the activated recycled carbon fibers during the recovery of the contaminants or salts from the brine solution.

In an embodiment of the present invention, the thermal recycling of carbon fibers is done via pyrolysis.

In another embodiment of the present invention, the carbon fibers are chopped into fine and manageable pieces prior to the pyrolysis, so that the pyrolysis occurs in a controlled manner.

In another embodiment of the present invention, the carbon fibers are chopped into fine and manageable square-shaped pieces of sizes in the range of 0.5-2 cm.

In another embodiment of the present invention, pyrolysis of the prepared carbon fibers comprises providing a controlled environment for thermal treatment of the carbon fibers in a furnace wherein, the furnace operates at varying temperatures and hold-up times.

In another embodiment of the present invention, the carbon fibers are pyrolyzed in a tube furnace at temperatures ranging from 500-800° C. and hold-up times ranging from 1-3 hours.

In another embodiment of the present invention, the mechanical reduction of the recycled carbon fibers comprises immersing the recycled carbon fibers in liquid nitrogen, followed by processing the recycled carbon fibers in a cryogenic ball mill to achieve a finely ground texture.

In another embodiment of the present invention, the chemical surface activation process comprises immersing the recycled carbon fibers in a hydroxide solution, under a controlled temperature; and washing the recycled carbon fibers in distilled water using vacuum filtration.

In another embodiment of the present invention, the chemical surface activation process for the mechanically reduced carbon fibers is done using via a hydroxide functional group (—OH).

In another embodiment of the present invention, the mechanically reduced carbon fibers are immersed in 1-3M sodium hydroxide solution.

In another embodiment of the present invention, the mechanically reduced carbon fibers are immersed in the sodium hydroxide solution under a temperature of 70-80° C. for up to 24 hours.

In another embodiment of the present invention, said mechanical reduction of the recycled carbon fibers and chemical surface activation of the recycled carbon fibers are done for modifying surface morphology of the carbon fibers, and thereby for improving selective adsorption properties of the recycled carbon fibers.

In another embodiment of the present invention, the brine is treated by mixing the brine solution with the chemically activated recycled carbon fibers and passing $CO_2$ gas through the resulting brine-carbon fibers mixture.

In another embodiment of the present invention, the treatment of brine is optimized by adjusting variables such as contact time, flow rate and brine concentration.

In another embodiment of the present invention, the chemically activated recycled carbon fibers capture/adsorb $CO_2$ into their pore structures for storage or utilization, thereby reducing $CO_2$ emissions.

As another aspect of the present invention, a system for utilizing carbon fibers for purification of rejected brine solution is disclosed, the system comprising a furnace providing a controlled environment for thermally treating and recycling the carbon fibers, a means for surface activation of the recycled carbon fibers and a means for exposing a mixture of brine and the recycled activated carbon fibers to $CO_2$ gas; wherein exposing the activated recycled carbon fibers along with the brine solution to $CO_2$ gas, results in the surface activated recycled carbon fibers selectively recovering contaminants or salts from the brine solution, along with $CO_2$ molecules being adsorbed by the activated recycled carbon fibers during the recovery of the contaminants or salts from the brine solution.

In an embodiment of the present invention, the furnace is a tube furnace for thermally recycling of the carbon fibers via pyrolysis.

In another embodiment of the present invention, a cryogenic ball mill further activates the recycled carbon fibers mechanically by grinding the carbon fibers into a finely ground texture after immersing in liquid nitrogen.

In another embodiment of the present invention, the mechanically activated carbon fibers are further activated chemically by immersing the mechanically activated carbon fibers in a hydroxide solution, under a controlled temperature; and washing the recycled carbon fibers in distilled water using a vacuum filtration setup.

In another embodiment of the present invention, the proposed system further comprises a bubbling (G-S-L) contact system for exposing the activated recycled carbon fibers along with the brine solution to $CO_2$ gas at varying flow rates and contact times.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
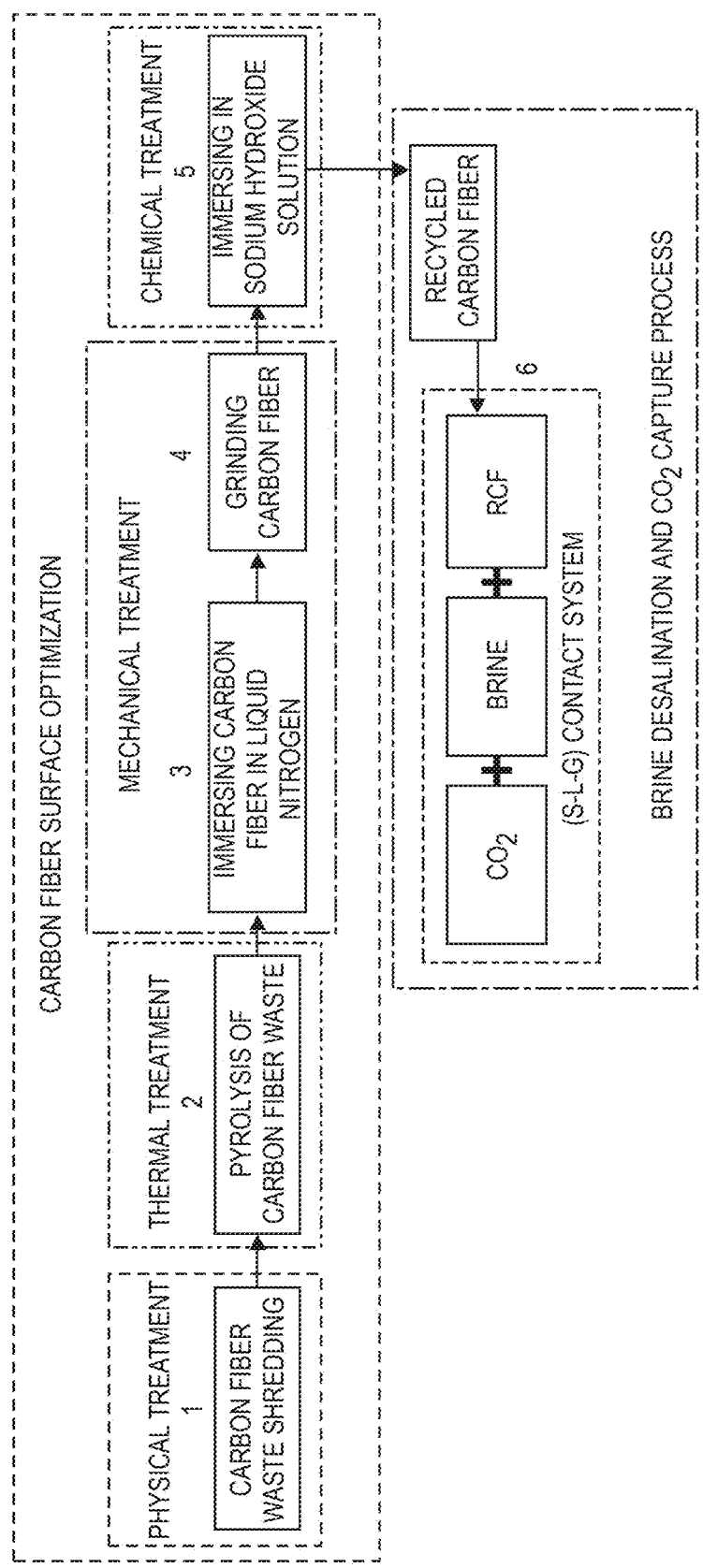
FIG. 1 shows a process chart for brine desalination and $CO_2$ capture using recycled carbon fiber, in accordance with the present invention.
Figure 2:
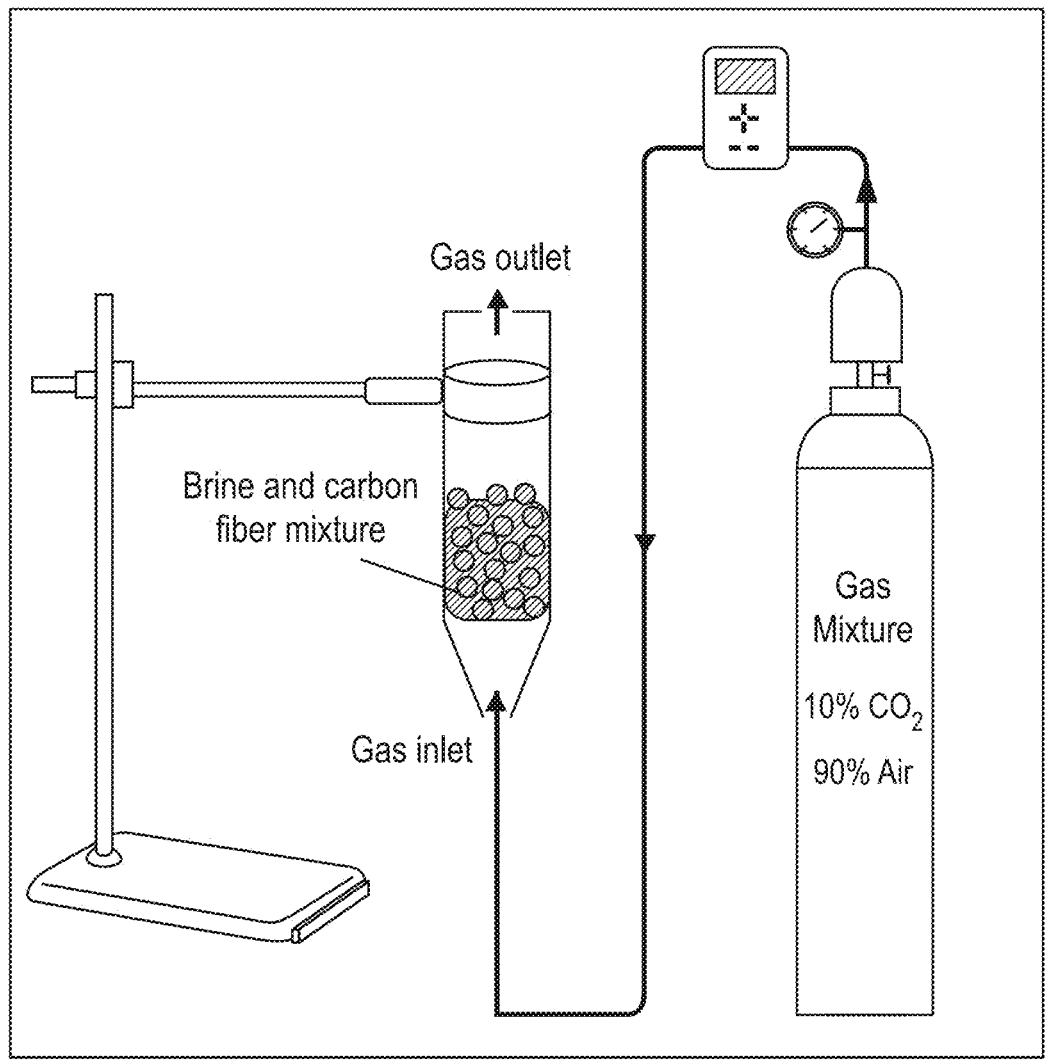
FIG. 2 shows a (G-L-S) contact system of the brine desalination and $CO_2$ capture process, in accordance with the present invention.

The aspects of the proposed solution for sustainable brine treatment, to reduce salinity and purify heavy metals and an alternative approach to recover carbon fibers used for the same—according to the present invention will be described in conjunction with FIGS. 1-9. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Pyrolysis involves the application of high temperatures in the absence of oxygen, leading to the thermal decomposition of organic materials. In the context of CFRP recycling, pyrolysis serves as a transformative process that breaks down the plastic resin matrix, liberating carbon fibers for subsequent use. This technique offers the advantage of preserving the structural integrity and mechanical properties of carbon fibers, making them suitable for various applications after recycling. Chemical recycling deploys solvents to degrade the resin matrix, yielding clean carbon fibers with retained high mechanical properties. This method offers an alternative approach to recover carbon fibers while avoiding the potential drawbacks associated with mechanical and thermal recycling. The use of solvents allows for precise control over the recycling process, ensuring the preservation of the fibers' inherent strength and performance characteristics.

The present invention discloses a sustainable methodology for tackling brine wastewater challenges by introducing an approach to reduce salinity and purify heavy metals through reactions with $CO_2$ gas and employing recycled carbon fiber as surface of the reaction.

The invention discloses a sustainable methodology for tackling brine wastewater challenges by introducing an approach to reduce salinity and purify heavy metals through reactions with $CO_2$ gas and employing recycled carbon fiber as surface of the reaction. The liquid stream to be treated is salt rich stream/brine (brine is not considered either alkaline or acidic wastewater stream). The experimental process is initiated by thermally recycling carbon fibers through pyrolysis, involving the mechanical reduction of carbon fibers to smaller dimensions and subsequent treatment in a tube furnace. The pyrolysis technique ensures the recovery of carbon fibers with optimal mechanical properties, offering a sustainable alternative to virgin carbon fibers. This furnace operates at varying temperatures and hold-up times, enabling the determination of optimal conditions for the recycling process. Surface modifications of the recycled carbon fibers are achieved through mechanical activation, involving grinding after immersing the samples in liquid nitrogen. These methods are crucial for enhancing the adsorption capacity and selectivity of the carbon fibers for brine treatment and $CO_2$ capture. The subsequent phase of the invention focuses on brine water treatment and $CO_2$ capturing using the recycled carbon fiber waste through pyrolysis, wherein the recycled carbon fibers are exposed to a thermal treatment in a tube furnace at temperatures ranging from 500-800° C. and hold-up times ranging from 1-3 hours. This involves a laboratory-based experimental design where carbon fibers are recycled thermally, followed by the preparation of grinded carbon fibers (involving processing the fibers in a cryogenic ball mill to achieve a finely ground texture) after immersing in liquid nitrogen. Brine treatment experiments are conducted in a bubbling (G-S-L) contact system, where a mixture of brine and carbon fibers is exposed to $CO_2$ gas at varying flow rates and contact times. The reduction in salinity and removal of many brine ions are monitored through standard methods. This multifaceted methodology not only contributes to the sustainable utilization of carbon waste but also holds considerable promise for applications in industries generating brine wastewater, particularly in water desalination. The core objective of this invention is to utilize recycled carbon fibers for the purification and treatment of rejected brine generated by desalination plants. The carbon fibers act as an adsorbent, selectively removing impurities from the brine through physical and chemical interactions. Beyond brine treatment, carbon fibers emerge as a pivotal tool for carbon dioxide ($CO_2$) capture through adsorption. The high surface area and intricate pore structure of carbon fibers make them highly effective in adsorbing $CO_2$ molecules. This dual-purpose utilization of recycled carbon fibers, addressing both brine treatment and $CO_2$ capture, demonstrates a synergistic and environmentally conscious approach to waste management and carbon sequestration. In another embodiment, surface activation of the recycled carbon fibers is achieved through chemical activation, involving immersing the samples in (1-3M) sodium hydroxide solution, under controlled temperature of 70-80° C. for 5-24 hours. The samples then are washed using distilled water using vacuum filtration. These methods are further improving the adsorption capacity and selectivity of the carbon fibers for brine treatment and $CO_2$ capture.

The core objective of this invention is to utilize recycled carbon fibers for the purification and treatment of rejected brine generated by desalination plants. The carbon fibers act as an adsorbent, selectively removing impurities from the brine through physical and chemical interactions. In accordance with the present invention, the proposed methodology includes potential supplementary surface treatments aimed at enhancing the adsorption rate and removal efficiency of the recycled carbon fibers. These treatments involve modifying the surface properties of carbon fibers to optimize their interaction with specific contaminants present in the brine. Beyond brine treatment, carbon fibers emerge as a pivotal tool for carbon dioxide ($CO_2$) capture through adsorption. The high surface area and intricate pore structure of carbon fibers make them highly effective in adsorbing $CO_2$ molecules. This dual-purpose utilization of recycled carbon fibers, addressing both brine treatment and $CO_2$ capture, demonstrates a synergistic and environmentally conscious approach to waste management and carbon sequestration. The collective utilization of recycled carbon fibers for brine treatment and $CO_2$ capture via adsorption offers a promising avenue for mitigating the environmental impact of brine disposal. By repurposing CFRP waste, this approach contributes to resource conservation and reduces the ecological footprint associated with traditional disposal methods. Additionally, the captured $CO_2$ can be utilized or stored, presenting a dual benefit in curtailing greenhouse gas emissions from diverse industrial processes and power plants. In addition to its environmental merits, the proposed methodology presents a cost-effective approach to addressing two significant environmental challenges simultaneously. By integrating CFRP recycling with brine treatment and $CO_2$ capture, industries have the opportunity to adopt sustainable practices that align with both environmental stewardship and economic efficiency.

The diverse origins of brine underscore its ubiquity and the need for comprehensive management strategies. The chemical composition of rejected brine from desalination plants exhibits significant variability, influenced by a myriad of factors throughout the water treatment process. Source water quality, pre-treatment methods, desalination processes employed, water recovery rates, and disposal methods all play pivotal roles in shaping the composition of brine. As indicated below in Table 1, brine characteristics vary across different locations, highlighting differences in temperature, pH, and concentrations of key ions such as calcium, magnesium, sodium, bicarbonate, sulfate, chloride, and total dissolved solids (TDS). These variations underscore the complexity of brine composition, necessitating a versatile and adaptable treatment approach to address the diverse contaminants present in different brine streams. The need for a versatile treatment method is imperative due to the dynamic nature of brine composition. A one-size-fits-all solution is not viable given the diverse factors influencing brine characteristics. Treatment methodologies must be flexible enough to accommodate variations in salinity, chemical composition, and physical properties observed in brine from different sources. This adaptability is essential for ensuring effective purification, reducing environmental impact, and facilitating the potential reuse or safe disposal of treated brine.

| | Abu-fintas Qatar (seawater) | Ajman (BWRO) | Um Quwain (BWRO) | Qidfa I Fujairah (BWRO) | Qidfa II Fujairah (seawater) |
|---|---|---|---|---|---|
| Temperature (° C.) | 40.0 | 30.6 | 32.5 | 32.2 | 29.10 |
| pH | 8.2 | 7.5 | 6.7 | 6.97 | 7.99 |
| Calcium (ppm) | 1350 | 312 | 173 | 631 | 631 |
| Magnesium (ppm) | 7600 | 413 | 282 | 2025 | 2096 |
| Sodium (ppm) | Not reported | 2759 | 2315 | 17295 | 18293 |
| Bicarbonate (ppm) | 3900 | 561 | 570 | 159 | 149.5 |
| Sulfate (ppm) | 3900 | 1500 | 2175 | 4200 | 4800 |
| Chloride (ppm) | 29000 | 4572 | 2762 | 30487 | 31905 |
| TDS (ppm) | 52000 | 10114 | 8275 | 54795 | 57935 |

Table 1—Chemical Characteristics of Rejected Brine from Desalination Plants

The environmental ramifications associated with the disposal of brine water have long been acknowledged, constituting a complex set of challenges that impact aquatic ecosystems. Discharging brine into water bodies can induce a cascade of adverse effects, including increased water salinity, elevated temperatures, and reduced dissolved oxygen content. These changes can have profound consequences on the health and balance of marine environments, leading to a range of ecological disruptions. The discharge of brine contributes to an elevation in water salinity levels in receiving bodies, posing a direct threat to marine life. This increase in salinity can disrupt osmotic equilibrium in marine organisms, leading to cellular dehydration, diminished turgor pressure, and potential fatality among various species. The delicate balance of marine ecosystems is particularly sensitive to changes in salinity, and the impact is not confined solely to the immediate discharge location but can extend to neighboring areas. The thermal effects associated with brine discharge contribute to elevated water temperatures in the receiving bodies. Coral reefs, among the most vulnerable ecosystems to temperature fluctuations, are particularly at risk. Increased temperatures can induce coral bleaching, affecting the symbiotic relationship between corals and their photosynthetic algae. The long-term consequences may include coral mortality, the degradation of reef structure, and the loss of biodiversity in these vital marine habitats.

The disposal of brine can lead to a reduction in dissolved oxygen levels in aquatic environments. This depletion of oxygen is detrimental to marine organisms that rely on aerobic respiration. In particular, benthic ecosystems may be adversely affected, as oxygen availability is critical for the survival of sediment-dwelling organisms. The consequences extend to open water organisms, potentially leading to changes in species diversity and abundance. Reject streams generated by both thermal and membrane desalination processes have a significant impact on marine ecosystems. The density of these reject streams, characterized by the concentrated brine, can have detrimental effects on benthic ecosystems, including seabed communities and organisms living in sediment layers. Open-water organisms can also be affected, highlighting the far-reaching consequences of brine disposal. The environmental challenges associated with brine disposal require the development of innovative and sustainable solutions. The current state of brine disposal practices highlights the urgency of adopting methods that not only mitigate environmental impacts, but also contribute to the principles of the circular economy by reusing waste materials. Traditional brine disposal methods, including direct discharge into water bodies, often have a negative impact on aquatic ecosystems. The development of innovative approaches is essential to address these environmental concerns. These approaches may involve advanced treatment technologies such as membrane distillation, forward osmosis or brine crystallization, which aim to minimize the environmental impact of brine discharge by recovering valuable resources or converting brine into manageable by-products.

The circular economy framework promotes the concept of closing the loop on material use, emphasizing the reduction of waste and the continuous use and reuse of resources. Brine management practices can align with these principles by transforming the waste stream into a valuable resource. This integration involves the reuse of brine and its components for beneficial applications, such as the extraction of minerals for industrial use or the use in the production of new materials. Technologies that allow the extraction of valuable minerals or salts from brine can contribute to both environmental protection and economic sustainability. For example, recovered salts can be reused in industrial processes, agriculture or other applications, reducing dependence on traditional sources of raw materials. Advances in brine treatment technologies play a key role in achieving sustainable solutions. Research and development efforts should focus on improving the efficiency of brine treatment processes, minimizing energy consumption and optimizing the recovery of valuable components. Technological innovation can transform brine disposal from a potential environmental hazard into an opportunity for resource utilization. Addressing the environmental concerns associated with brine disposal requires a collaborative effort among stakeholders, including government agencies, industry, researchers and environmental organizations. The establishment of robust regulatory frameworks that incentivize sustainable practices and penalize environmentally damaging disposal methods is essential. In addition, fostering collaboration through public-private partnerships can accelerate the adoption of innovative solutions and the development of best practices.

A range of studies have explored the use of chemical precipitation in brine treatment. One reference discloses a combination of $Na_2CO_3$ and NaOH effectively reducing scale in reverse osmosis brine, while $BaCl_2$ being able to remove sulfate ions. However, the latter is not recommended due to its toxicity. Another reference highlighted the challenges of chemical precipitation, including high cost and hazardous sludge production, and suggested alternative pretreatment options such as electrocoagulation and nanofiltration, while another reference investigated the use of clay minerals and organoclays as flocculants in pickle industry brine wastewater, with promising results in reducing turbidity, suspended solids, and chemical oxygen demand. A reference also discloses a brine treatment protocol using Eutectic Freeze Crystallization, which showed potential for multi-component brines. Carbon fibers, celebrated for their exceptional strength, elasticity, low density, and chemical stability, have become integral components in various industries due to their versatile properties. The different types of carbon fibers, such as PAN-based (polyacrylonitrile) and pitch-based, exhibit diverse mechanical properties, including tensile strength, modulus of elasticity, elongation at break, and diameters. Recognizing the significance of carbon fibers and their widespread use, recycling these materials is crucial for fostering sustainable practices within industries. Various recycling processes, including mechanical, thermal, and chemical methods, are employed, each presenting unique advantages and drawbacks.

The choice of recycling method plays a pivotal role in determining the resulting mechanical properties of the recycled fibers. Carbon fibers are revered for their exceptional combination of properties, making them sought-after materials in industries ranging from aerospace and automotive to construction and sports. Their high strength-to-weight ratio, outstanding elasticity, low density, and chemical stability contribute to their versatility in fulfilling diverse functional requirements within different applications. The unique characteristics of carbon fibers position them as key contributors to advancements in materials science and engineering. Two primary types of carbon fibers, PAN-based and pitch-based, exhibit variations in their mechanical properties. PAN-based carbon fibers are widely used and known for their high tensile strength, modulus of elasticity, and excellent thermal stability. On the other hand, pitch-based carbon fibers are distinguished by their superior heat resistance and lower modulus of elasticity compared to PAN-based fibers. The choice between these types depends on the specific requirements of the intended application. Additionally, variations in fiber diameters further contribute to the diverse mechanical characteristics of carbon fibers. The widespread use of carbon fibers underscores the importance of implementing sustainable practices in their lifecycle management. Recycling carbon fibers is imperative for several reasons. Firstly, it reduces the environmental impact associated with the production of new carbon fibers, which involves energy-intensive processes. Secondly, recycling allows for the recovery of valuable materials, contributing to resource conservation. Lastly, recycling aligns with the principles of a circular economy by extending the lifespan of carbon fibers and minimizing waste generation. The main recycling processes for carbon fibers include mechanical, thermal, and chemical methods. Mechanical recycling involves the physical breakdown of fibers, while thermal recycling utilizes heat to dismantle scrap composites, and chemical recycling deploys solvents to degrade the resin matrix. Each method has its advantages and drawbacks, impacting the mechanical properties of the recycled fibers. Mechanical recycling, for instance, may result in shorter fiber lengths, influencing tensile strength. Thermal recycling, while efficient, requires careful control to prevent fiber degradation. Chemical recycling, although offering high purity, demands consideration of the environmental impact of solvents. Balancing the need for efficient resource recovery with the preservation of mechanical properties is essential.

Surface treatment of carbon fibers is a critical step in optimizing their properties for specific applications. Various treatment methods, such as ferrous oxalate, alkaline materials like NaOH, and activation processes, play pivotal roles in improving surface cleanliness, roughness, and overall performance. These treatments are tailored to enhance the adhesion, compatibility, and functional characteristics of carbon fibers in diverse industrial applications. Research on carbon fiber for $CO_2$ purification has shown promising results. The studies collectively underscore the potential of carbon fiber in $CO_2$ purification, with a focus on stability, high performance, and material properties. Porous carbon fibers, derived from cross-linked porous polyacrylonitrile (PAN) fibers, exhibit a nitrogen content exceeding 14 wt. % and an optimal BET surface area of 277.4 $m^2$/g with micro/meso/macropores. The enhanced porous structure and nitrogen functionalities contribute to a $CO_2$ adsorption capacity 2.1 times higher than non-cross-linked fibers under atmospheric pressure and 1.4 times higher in a simulated flue gas environment, demonstrating their significant role in $CO_2$ adsorption. In conclusion, the proposed invention aims to address the intricate challenges posed by brine water disposal through an innovative and sustainable integration of recycled carbon fibers.

The methodology employed in the present invention revolves around the utilization of recycled carbon fibers to purify and treat rejected brine generated by desalination plants. Acting as an adsorbent, the carbon fibers selectively remove impurities from the brine through a combination of physical and chemical interactions. The proposed method extends to potential supplementary surface treatments designed to enhance the adsorption rate and removal efficiency of the recycled carbon fibers. These treatments focus on modifying the surface properties of the carbon fibers to optimize their interaction with specific contaminants in the brine and $CO_2$ gas. The versatility of carbon fibers is further highlighted as they prove to be a pivotal tool for carbon dioxide ($CO_2$) capture through adsorption, leveraging their high surface area and intricate pore structure. This dual-purpose application of recycled carbon fibers, addressing both brine treatment and $CO_2$ capture, exemplifies a synergistic and environmentally conscious waste management and carbon sequestration strategy. Repurposing CFRP waste not only contributes to resource conservation but also reduces the ecological footprint associated with conventional disposal methods. Moreover, the captured $CO_2$ serves a dual purpose by either being utilized or stored, offering a valuable contribution to mitigating greenhouse gas emissions from various industrial processes and power plants.

The first step involves recycling carbon fiber. The inception of the research methodology lies in the meticulous recycling of carbon fibers waste, as shown in FIG. 1—a fundamental step toward ensuring the sustainability and functionality of the proposed brine treatment system. FIG. 1 illustrates the key stages of the proposed method for brine desalination and $CO_2$ capture, utilizing recycled carbon fiber. The chosen method, pyrolysis, is a well-established technique renowned for successfully reclaiming carbon fibers from diverse sources. This is followed by the preparation of carbon fibers. The process commences with the careful preparation of carbon fibers sourced from waste materials. These fibers are initially finely chopped into small, manageable pieces (manageable square-shaped pieces of sizes in the range of 0.5-2 cm).

The importance of this initial sizing lies in achieving uniform and controllable outcomes in the subsequent pyrolysis process. The chopped fibers undergo precise weighing to ensure accuracy in the experimental setup. The next step involves the tube furnace operation. The heart of the recycling process resides in the tube furnace, providing a controlled environment for the thermal treatment of carbon fibers. Operating at different temperatures and varying hold-up times, the tube furnace facilitates the pyrolysis process. A systematic approach is employed to optimize this thermal treatment. The temperature is first adjusted at 500° C. while keeping the hold-up time constant for 1 hour, allowing the determination of the optimal temperature.

The next step is the refinement process. Following pyrolysis, the recycled fibers undergo a refinement process to enhance their surface characteristics. Immersion in liquid nitrogen for 5 minutes precedes further processing in a cryogenic ball mill, resulting in finely ground fibers. Careful loading into a 100 ml syringe, securely connected to a carbon dioxide gas cylinder, sets the stage for the subsequent recycling reaction. The final step involves the chemical activation process. Following the mechanical activation, the recycled fibers undergo a chemical activation to activate their surface with hydroxide functional group (—OH). Immersion of the samples occurs in (1-3M) sodium hydroxide solution, under a controlled temperature of 70-80° C. for 5-24 hours. The samples then are washed using distilled water using vacuum filtration setup. These methods further improve the adsorption capacity and selectivity of the carbon fibers for brine treatment and $CO_2$ capture.

The primary aspect of the present invention lies in its approach towards addressing the dual challenges of brine disposal from desalination plants and the escalating demand for sustainable carbon fiber utilization. Unlike existing methods, the proposed methodology introduces a novel, sustainable method that synergistically combines the recycling prowess of carbon fibers with advanced brine treatment and $CO_2$ capture through chemical reactions. Firstly, the utilization of recycled carbon fibers, obtained through a meticulously designed pyrolysis process, sets this invention apart. The pyrolysis technique ensures the recovery of carbon fibers with optimal mechanical properties, offering a sustainable alternative to virgin carbon fibers. The methodology includes crucial steps of thermal recycling, minimizing environmental impact by avoiding chemical solvents and facilitating the recovery of fibers without compromising their structural integrity. This inventive recycling process addresses the escalating demand for carbon fibers globally, contributing to an eco-friendlier and resource-efficient carbon fiber industry. The innovation extends to the subsequent surface treatments applied to the recycled carbon fibers, enhancing their adsorption capacity and selectivity for brine treatment and $CO_2$ capture. Surface treatments, such as mechanical grinding after immersing with liquid nitrogen, introduce tailored modifications to the fiber's surface morphology. This ensures the suitability of the recycled carbon fibers for efficient brine treatment and $CO_2$ capture, outperforming traditional methods. Moreover, the invention integrates the recycled carbon fibers into a new method for brine treatment, wherein $CO_2$ gas is passed through a mixture of brine and modified recycled carbon fibers. The method meticulously investigates key variables such as contact time, flow rate, and brine concentration, ensuring a systematic and optimized approach. The inventive use of recycled carbon fibers in this brine treatment method showcases a sustainable and cost-effective solution for carbon waste utilization, bridging the gap between waste reduction and environmental conservation.

As another aspect of the present invention, the application of carbon fiber for $CO_2$ capture brings an additional layer of innovation. Carbon fiber, known for its high surface area and pore structure, ensures efficient adsorption of $CO_2$ molecules, thereby contributing to the reduction of $CO_2$ emissions from industrial processes and power plants. This dual-purpose utilization of recycled carbon fiber in tandem for brine treatment and $CO_2$ capture establishes a comprehensive and environmentally conscious methodology, offering an integrated solution to multiple environmental challenges. In summary, this invention represents a paradigm shift in sustainable waste utilization, offering a unique blend of carbon fiber recycling, brine treatment, and $CO_2$ capture. The integrated approach ensures not only the optimal use of recycled carbon fibers but also addresses the pressing environmental concerns associated with brine disposal and $CO_2$ emissions, marking a significant stride towards a more sustainable and eco-friendly industrial landscape.

In accordance with another embodiment of the present invention, there is proposed a recycling experimental setup, to create an optimal environment for the recycling reaction, wherein 30 ml of rejected brine water is introduced into the syringe along with the ground carbon fibers. The experimental setup is meticulously maintained for a duration of 2 hours, during which carbon dioxide (gas mixture of 10% $CO_2$) continuously flows through the mixture of fibers and brine water. A schematic diagram for the (G-L-S) system is presented in FIG. 2. The collected solids after reaction of brine, carbon fiber and $CO_2$ gas mixture are then collected and dried for further use in several types of analyses, such as X-ray Diffraction (XRD) analysis, SEM analysis and FTIR analysis.

Figure 3A:
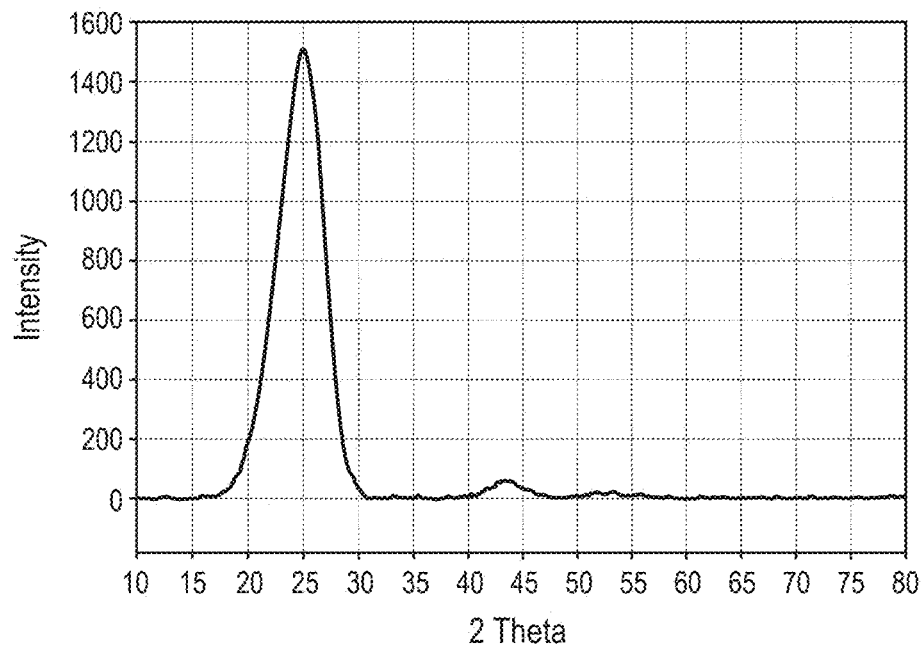
FIG. 3A is a graphical representation of X-ray diffraction patterns of recycled carbon fiber after mechanical activation and before reaction with brine and $CO_2$ gas mixture.
Figure 3B:
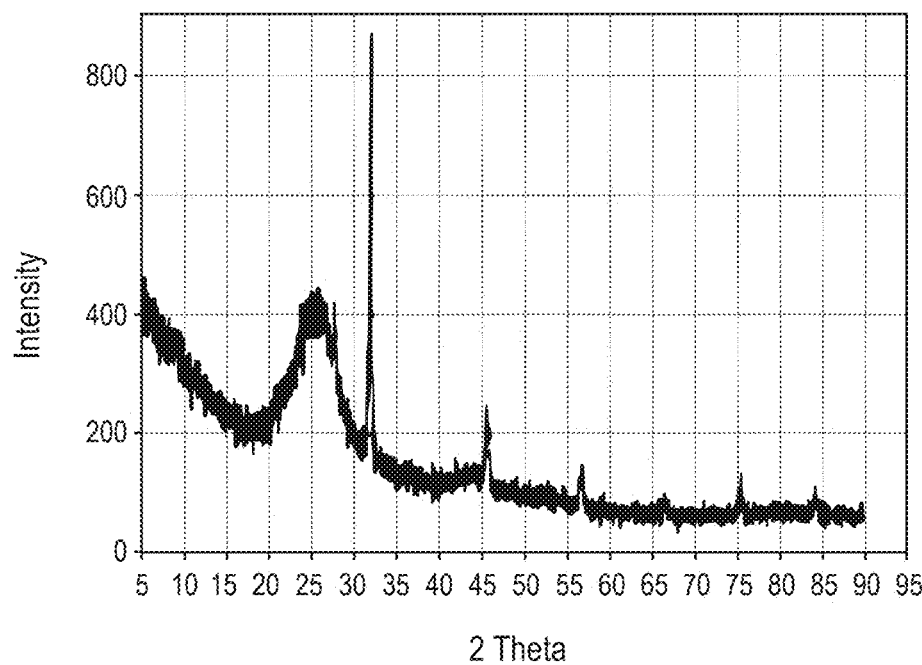
FIG. 3B shows X-ray diffraction patterns of the same recycled carbon fiber after reaction with brine and $CO_2$ gas mixture—in accordance with the present invention.

In order to investigate the structural properties of the gathered specimens, X-ray diffraction (XRD) analysis is carried out using Cu Kα radiation with a wavelength (λ) of 1.54 Å. The diffraction pattern is generated at a tube current of 30 mA and a target voltage of 40 kV. Scanning covers the 2θ range from 5° to 70° (2Θ) min$^{-1}$ to encompass all significant diffraction peaks, with a scan speed set at 2° (2Θ) min$^{-1}$. The identification of XRD diffraction peaks in the obtained solids is based on the theoretical intensity of the three most prominent peaks for each mineral in its pure state. This comprehensive analysis aims to unveil the distinct structural characteristics of the collected samples. FIGS. 3A and 3B graphically show the XRD analysis for the recycled carbon via mechanical activation process before and after reaction with brine and $CO_2$ gas mixture. The XRD analysis conducted on the untreated carbon fiber and the solids obtained after treatment, conclusively affirms the successful recovery of brine salts in the forms of sodium bicarbonate ($NaHCO_3$), calcium sulfate ($CaSO_4$), calcium chloride ($CaCl_2$)), and calcium carbonate ($CaCO_3$). The diffractograms reveal prominent peaks for each product, with the three most intense peaks occurring at 2Θ angles of (30.09, 34.56, 28.88), (25.61, 31.48, 38.99), (29.44, 19.91, 38.71), and (29.44, 43.14, 39.57) for sodium bicarbonate, calcium sulfate, calcium chloride, and calcium carbonate, respectively. In contrast, the XRD analysis of the carbon fiber sample prior to its interaction with brine and $CO_2$ gas exhibits a distinctive intense peak at a diffraction angle of 2Θ 25.5, indicative of its graphitic structure. This comprehensive examination through XRD provides crucial insights into the structural transformations and composition changes undergone by the carbon fiber during the treatment process, underscoring the efficacy of the proposed methodology in recovering specific brine salts.

The surface morphology, texture, and shape of the samples are characterized using Scanning Electron Microscopy (SEM). To enhance conductivity and imaging quality, a preliminary coating with a 300 Å gold layer is applied to the samples. The analysis involves a detailed examination of three distinct regions to capture variations in surface features. Furthermore, Energy-Dispersive X-ray Spectroscopy (EDS) analysis is conducted to identify and quantify the primary elements present in each collected sample. This combined SEM-EDS approach provides a comprehensive understanding of both the structural and elemental composition of the specimens.

Figure 4A:
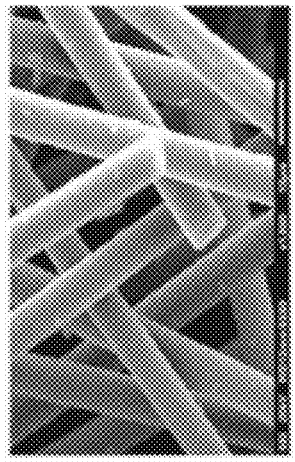
FIG. 4A shows results from SEM for a recycled carbon fiber after mechanical activation and before reaction with brine and $CO_2$ gas mixture.
Figure 4A:
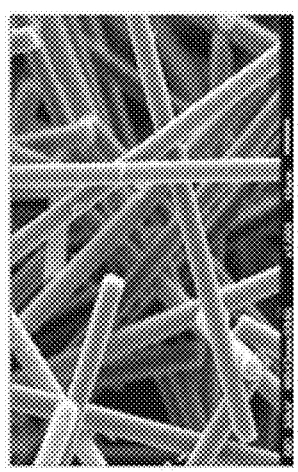
Figure 4A:
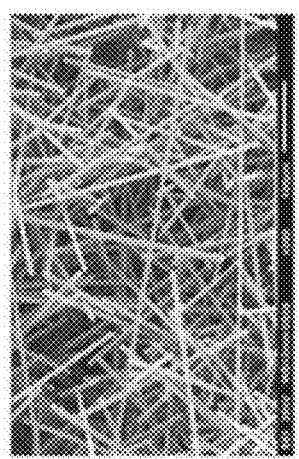
Figure 4B:
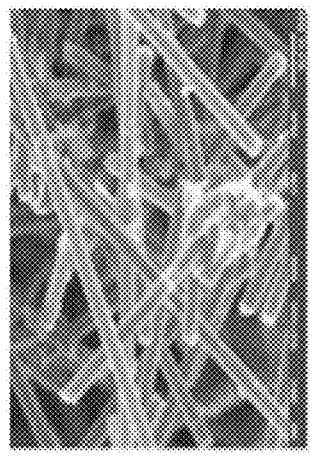
FIG. 4B shows results from SEM of the same recycled carbon fiber after reaction with brine and $CO_2$ gas mixture—in accordance with the present invention.
Figure 4B:
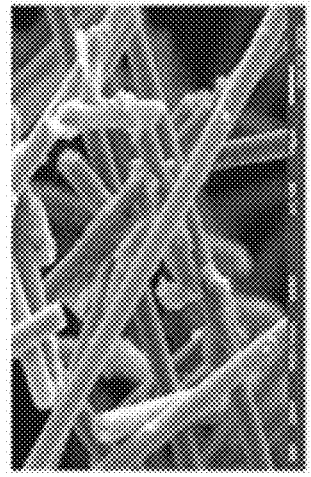
Figure 4B:
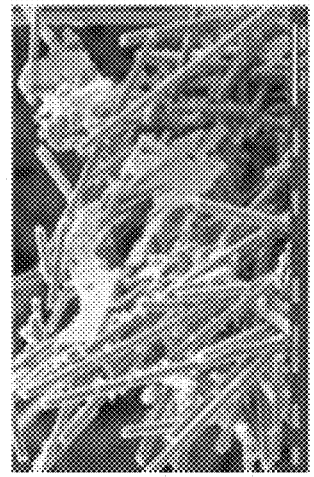

FIGS. 4A and 4B graphically show the SEM analysis images for the recycled carbon fiber via mechanical activation before and after reaction with brine and $CO_2$ gas mixture. The examination of the structure and external morphology of recycled carbon fibers, both before and after exposure to brine and $CO_2$ gas, is meticulously conducted using Scanning Electron Microscopy (SEM) on finely dried solid samples. A comprehensive analysis of the SEM images reveals significant disparities in the structure, morphology, and physical properties of the collected solids before and after the reaction. In FIG. 4A, the SEM analysis of recycled carbon fibers unveils predominantly smooth fibers with a distinct graphitic structure, resembling rods with a high surface area conducive to chemical precipitation reactions. In contrast, FIG. 4B distinctly portrays the presence of numerous brine salts adhering to the carbon fiber rods. Various components are discernible through SEM analysis, including polycrystalline vaterite ($CaCO_3$) characterized by a spherical crystal habit. Sodium bicarbonate, as indicated in the same figure, manifests elongated rods with larger particle sizes than calcium carbonate. The SEM image further reveals diverse morphological structures, encompassing moderate-sized needles and small shells surrounding a few rhombic crystals.

Figure 5A:
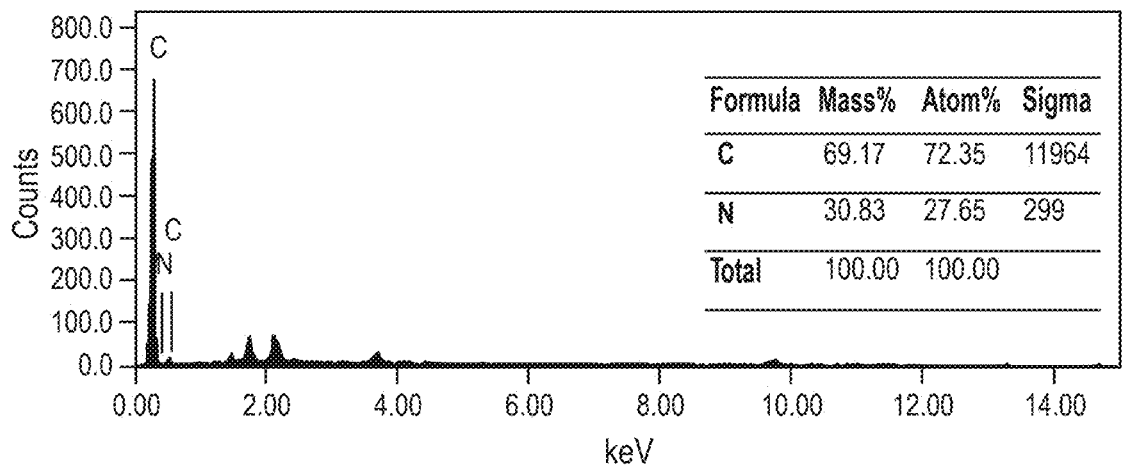
FIG. 5A shows results from EDS analyses of recycled carbon fiber after mechanical activation and before reaction with brine and $CO_2$ gas mixture.
Figure 5B:
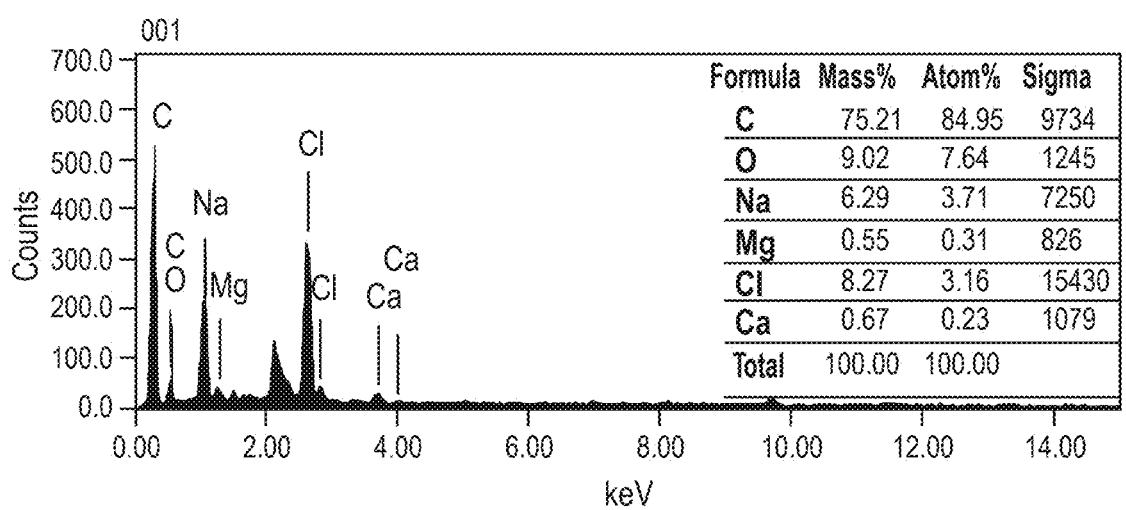
FIG. 5B shows results from EDS analyses of the same recycled carbon fiber after reaction with brine and $CO_2$ gas mixture in accordance with the present invention.

FIGS. 5A and 5B provide EDS analyses over three distinct spots for each sample. FIG. 5A showcases EDS analysis for recycled carbon fibers, primarily identifying the carbon structure. Conversely, FIG. 5B confirms the presence of various brine species such as sodium, magnesium, calcium, potassium, and chloride. These ions substantiate the efficacy of chemical precipitation of brine salts and their interaction with recycled carbon fibers. Notably, the treated sample exhibits a substantial increase in carbon content, affirming the efficiency of $CO_2$ capture from the gas stream as carbonate compounds on the external surface of carbon fibers.

Figure 6A:
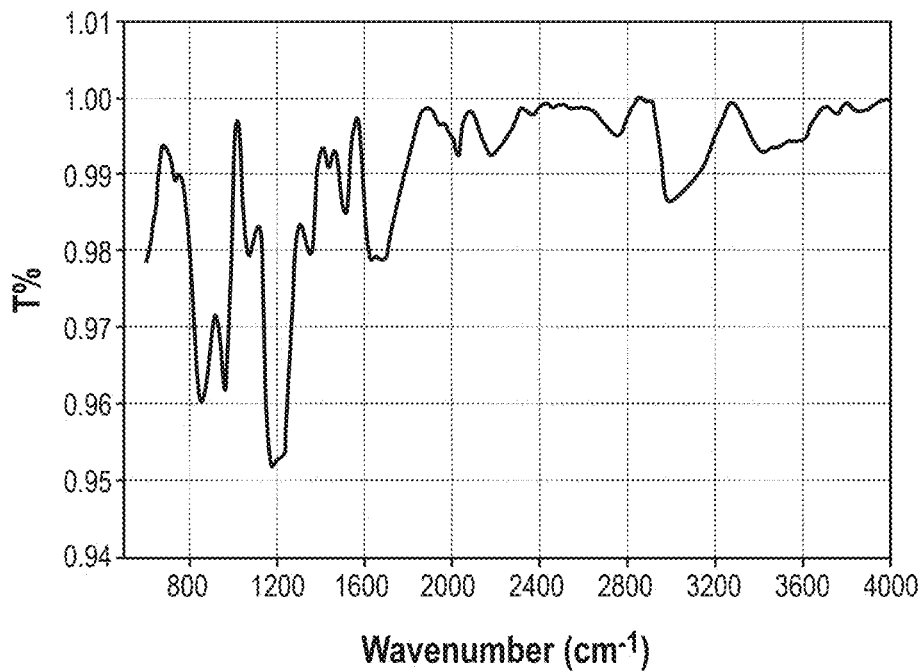
FIG. 6A is a graphical representation of FTIR analysis of recycled carbon fiber after mechanical activation and before reaction with brine and $CO_2$ gas mixture.
Figure 6B:
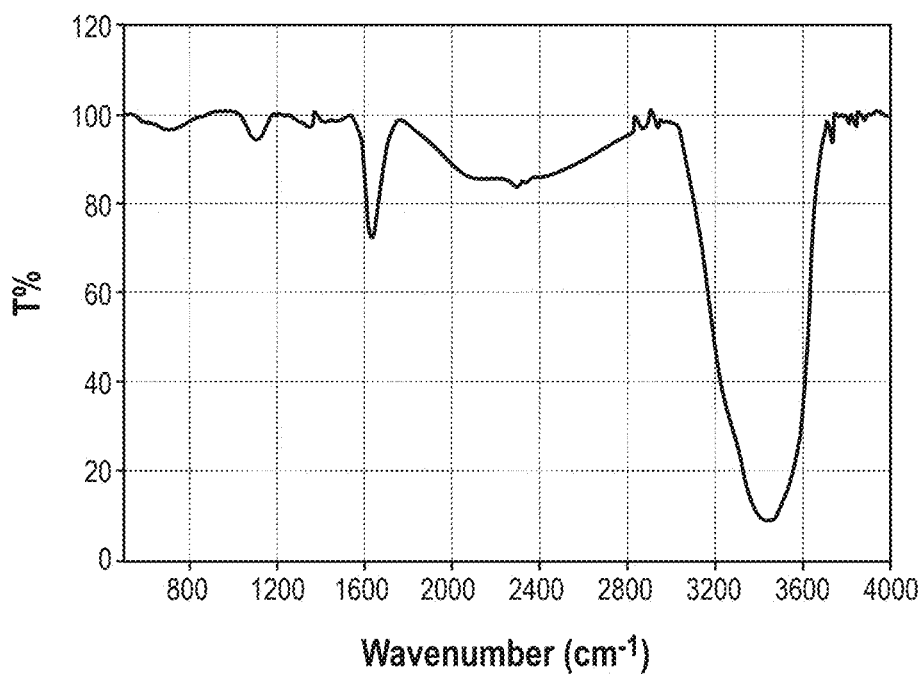
FIG. 6B shows FTIR analysis of the same recycled carbon fiber after reaction with brine and $CO_2$ gas mixture—in accordance with the present invention.

In another embodiment, the investigation into the presence of essential functional groups in the collected solids involves Fourier-transform infrared (FTIR) analysis. An IRTrace-100 FTIR spectrophotometer is employed for this purpose. The spectral data is recorded over a wavelength range of 500 to 4000 cm$^{-1}$, ensuring comprehensive coverage of relevant infrared frequencies. The FTIR analysis utilizes a spectral resolution of 4 cm$^{-1}$, with 34 scans performed to enhance data accuracy and reliability. This methodology facilitates the identification and characterization of key functional groups present in the examined samples. FIGS. 6A and 6B graphically show the FTIR Analysis for the recycled carbon fiber via mechanical activation before and after reaction with brine and $CO_2$ gas mixture. Spectroscopic data acquisition spanning the range of 500-4000 cm$^{-1}$, with a spectral resolution of 4 cm$^{-1}$ and an average of 34 scans is integral to the investigation.

FIG. 5 portrays distinctive absorption features that characterize the various solid samples, providing clear differentiation among the materials under examination. In the case of recycled carbon fiber, FIG. 6 highlights characteristic peaks associated with specific wavenumbers. The peak at 3400 cm$^{-1}$ is attributed to the —OH group, while that at 1650 cm$^{-1}$ corresponds to the C═O group. Additionally, peaks at 1540 cm$^{-1}$ and 1320 cm$^{-1}$ signify the C—C and C—O bonds, respectively. Post-reaction, a noticeable decrease in the OH-group peaks is evident, accompanied by stretching vibrations of C—H bonds within the 2900-3700 cm$^{-1}$ range. For carbon fiber subjected to brine and $CO_2$, the FTIR spectrum reveals prominent peaks at 1770 and 1400 cm$^{-1}$ corresponding to $CaCO_3$ components. Additionally, the presence of $NaHCO_3$ products is distinctly identified through peaks at 3720, 3440, and 2891 $cm^{-1}$, closely aligning with the spectral characteristics observed in its pure state. The FTIR analysis effectively delineates the structural changes in the carbon fibers resulting from the brine and $CO_2$ interaction, providing explicit insights into the chemical transformations undergone during the reaction.

Figure 7:
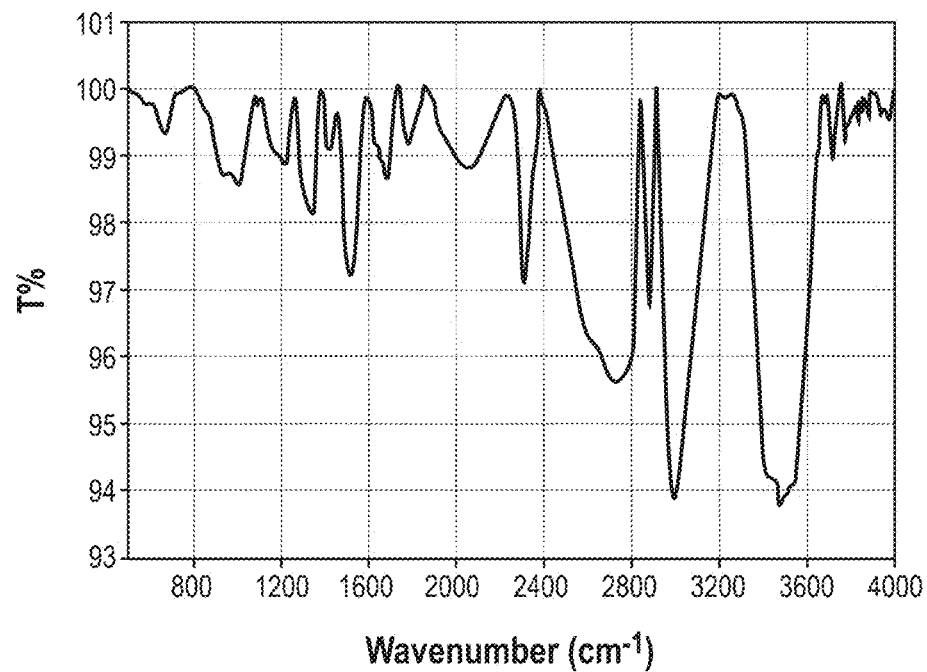
FIG. 7 shows graphical results from FTIR analysis of recycled carbon fiber after chemical activation with sodium hydroxide and before reaction with brine and $CO_2$ gas, in accordance with the present invention.
Figure 8:
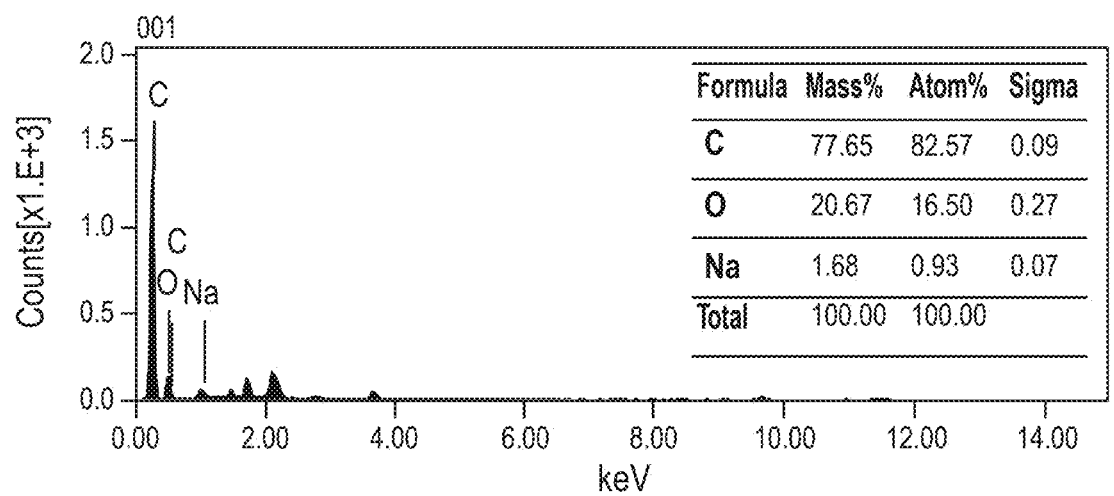
FIG. 8 shows graphical results from EDS of recycled carbon fiber after chemical activation with sodium hydroxide and before reaction with brine and $CO_2$ gas, in accordance with the present invention.
Figure 9:
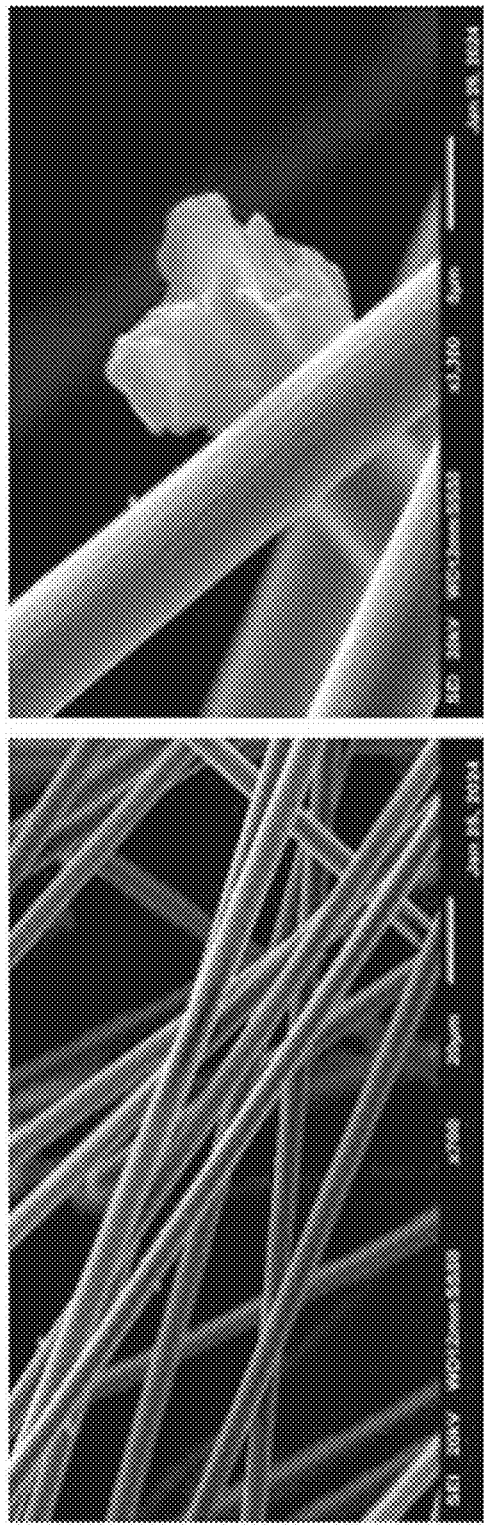
FIG. 9 shows graphical results from SEM of recycled carbon fiber after chemical activation with sodium hydroxide and before reaction with brine and $CO_2$ gas, in accordance with the present invention.
Figure 10:
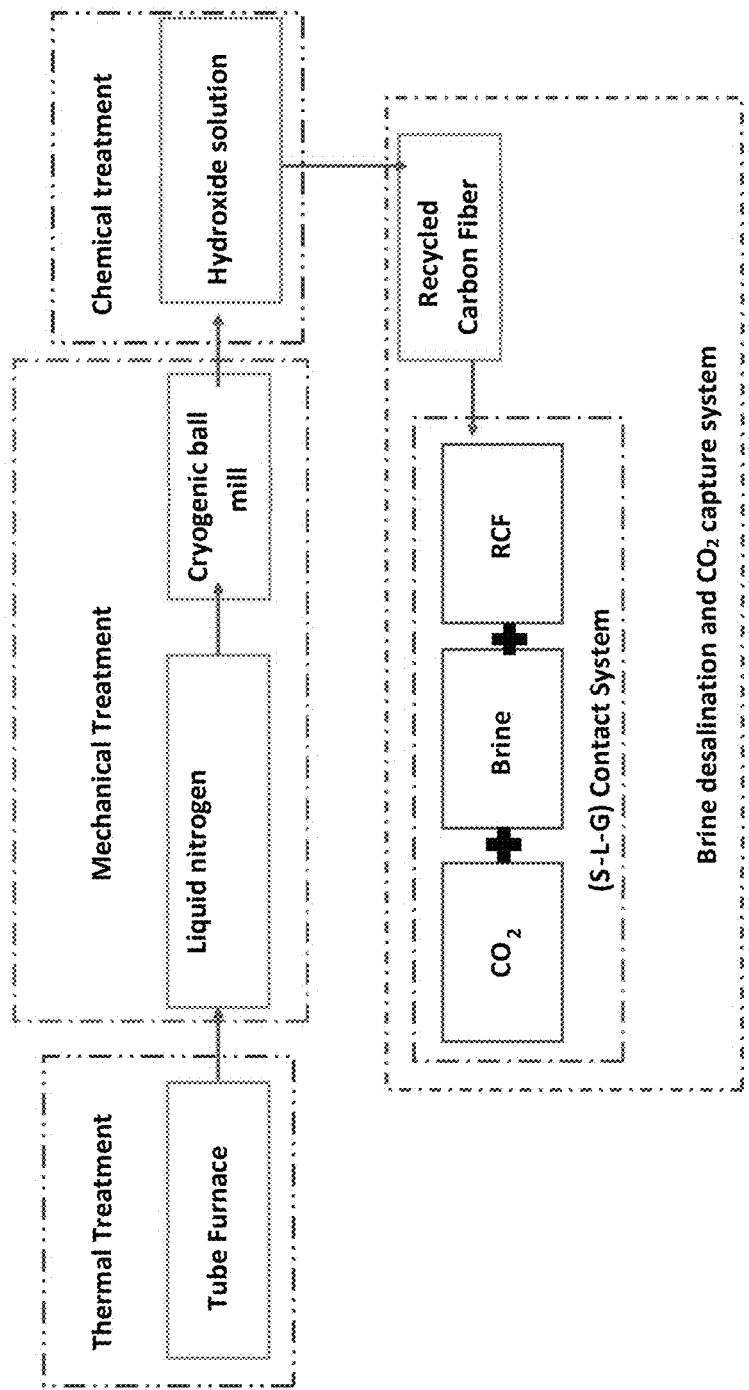
FIG. 10 shows a system for utilizing carbon fibers for purification of brine solution, in accordance with the present invention.

Considering the effect of chemical activation process on recycled carbon fiber surface and chemical characteristics in accordance with the present invention, the chemical activation process employed for mechanically activated carbon fiber is aimed to further enhance surface characteristics and improve adsorption capabilities for brine salts and $CO_2$ capture. FIG. 7 shows graphical results from FTIR analysis of recycled carbon fiber after chemical activation with sodium hydroxide and before treatment with brine and $CO_2$ gas, in accordance with the present invention. FIG. 8 shows graphical results from EDS of recycled carbon fiber after chemical activation with sodium hydroxide and before treatment with brine and $CO_2$ gas, in accordance with the present invention. FIG. 9 shows graphical results from SEM of recycled carbon fiber after chemical activation with sodium hydroxide and before treatment with brine and $CO_2$ gas, in accordance with the present invention.

Samples subjected to the chemical treatment exhibit notable features, particularly the pronounced increase in hydroxide functional groups (—OH) on the surface, as revealed by Fourier Transform Infrared (FTIR) analysis (as shown in FIG. 7). The EDS analysis, as shown in FIG. 8, demonstrates a substantial alteration in the composition of the activated carbon fiber. Notably, the nitrogen content is replaced with a higher oxygen content, indicating the presence of hydroxide functional groups. This transformation serves as a crucial parameter influencing the efficiency of $CO_2$ capture, subsequently leading to the precipitation of brine salts upon the formation of carbonated and bicarbonate salts on the carbon fiber surface. The increased hydroxide functional groups play a pivotal role in this process. Furthermore, the SEM analysis, as illustrated in FIG. 9, elucidates the morphological changes in the recycled carbon fiber following treatment with sodium hydroxide within a temperature range of 70-80° C. The carbon fiber surface now exhibits a more rugged topography with shallow curvatures and channels, as evidenced by the SEM micrographs. These findings substantiate the enhancements observed in brine desalination and $CO_2$ capture, attributing these improvements to the physical alterations on the carbon fiber surface induced by the chemical treatment. In summary, the integration of chemical activation, as evidenced by the increased hydroxide functional groups and morphological changes, proves to be instrumental in augmenting the efficiency of brine desalination and $CO_2$ capture compared to employing only mechanical treatment on the carbon fiber.

The incorporation of analytical techniques, including SEM, EDS, XRD, and FTIR yields a comprehensive understanding of the dynamic transformations occurring in recycled carbon fiber samples upon exposure to a brine and $CO_2$ gas mixture. The multifaceted analyses collectively verify the successful recovery of diverse brine components, encompassing magnesium hydroxide, calcium carbonate, sodium bicarbonate, calcium sulfate, and calcium chloride. Additionally, the proposed system exhibits the capacity to capture $CO_2$ from the simulated effluent gas. SEM, as depicted in the results, elucidated structural disparities between recycled carbon fiber before and after the reaction with brine and $CO_2$ gas. This visual evidence underscores the efficiency of the chemical precipitation process in selectively recovering these salts during the reaction, providing valuable insights into the morphological changes induced by the treatment. FTIR analysis further complemented the findings by revealing shifts in the functional groups of recycled carbon fiber samples. These spectral changes indicate alterations in chemical bonding, substantiating the occurrence of chemical reactions during the brine and $CO_2$ gas interaction. The identification of specific functional groups and their shifts serves as a molecular-level confirmation of the transformative processes undergone by the recycled carbon fibers. The collective outcomes underscore the efficacy of the chemical precipitation process not only in the recovery of a diverse array of brine salts but also in capturing $CO_2$, thereby highlighting the potential of this approach for resource recovery and sustainable waste management.

In conclusion, the benefits derived from the proposed methodology extend beyond individual aspects, creating a holistic and sustainable solution. From addressing the global demand for carbon fibers to providing cost-effective brine treatment and contributing to $CO_2$ emission reduction, the invention stands as a beacon for environmentally conscious and economically viable practices in industrial processes. The methodology employed in this innovative approach revolves around the utilization of recycled carbon fibers to purify and treat rejected brine generated by desalination plants. Acting as an adsorbent, the carbon fibers selectively remove impurities from the brine through a combination of physical and chemical interactions. The proposed methodology extends to potential supplementary surface treatments designed to enhance the adsorption rate and removal efficiency of the recycled carbon fibers. These treatments focus on modifying the surface properties of the carbon fibers to optimize their interaction with specific contaminants in the brine and $CO_2$ gas. The versatility of carbon fibers is further highlighted as they prove to be a pivotal tool for carbon dioxide ($CO_2$) capture through adsorption, leveraging their high surface area and intricate pore structure. This dual-purpose application of recycled carbon fibers, addressing both brine treatment and $CO_2$ capture, exemplifies a synergistic and environmentally conscious waste management and carbon sequestration strategy. Repurposing CFRP waste not only contributes to resource conservation but also reduces the ecological footprint associated with conventional disposal methods. Moreover, the captured $CO_2$ serves a dual purpose by either being utilized or stored, offering a valuable contribution to mitigating greenhouse gas emissions from various industrial processes and power plants.

In accordance with the present invention, the carbon fiber is treated via a physical and mechanical treatment in addition to a chemical treatment using sodium hydroxide, the source of carbon fiber being a waste carbon fiber combined with composite material (the type of reaction occurring being adsorption brine salts with carbonate ions on the surface of the carbon fiber).

The methodology developed in accordance with the present invention offers a myriad of benefits that collectively contribute to sustainable resource utilization, efficient brine treatment, and environmentally conscious $CO_2$ capture. These benefits span across various dimensions, making the proposed invention a promising and comprehensive solution.

a. Sustainable Carbon Fiber Utilization—The recycling process, primarily employing pyrolysis, yields recycled carbon fibers with mechanical properties comparable to virgin fibers. This sustainable approach to carbon fiber utilization directly addresses the increasing demand for these materials globally. As a result, the invention offers an environmentally friendly alternative to conventional carbon fiber production methods, reducing the industry's reliance on raw materials and minimizing ecological impact.
b. Cost-Effective Brine Treatment—The incorporation of recycled carbon fibers in the brine treatment process provides a cost-effective solution for managing the disposal of brine from desalination plants. By utilizing recycled materials, the methodology contributes to waste reduction and simultaneously addresses the environmental challenges posed by brine disposal. This cost-effective approach ensures the feasibility and scalability of the proposed solution for widespread implementation.
c. Enhanced Adsorption Efficiency—The surface treatments applied to recycled carbon fibers significantly enhance their adsorption capacity. This improvement in adsorption efficiency is crucial for the success of brine treatment and $CO_2$ capture. The modified fibers exhibit superior performance, ensuring optimal removal of impurities from brine water and efficient capture of $CO_2$, thereby maximizing the environmental impact of the invention.
d. Adaptable Application in $CO_2$ Capture—The utilization of carbon fiber for $CO_2$ capture extends the versatility of the methodology. Carbon fiber's high surface area and pore structure provide an efficient platform for capturing $CO_2$ molecules, contributing to the reduction of greenhouse gas emissions from industrial processes and power plants. This dual-purpose application of recycled carbon fiber showcases the invention's adaptability and effectiveness in addressing multiple environmental challenges. The dual application of activated carbon for $CO_2$ capture expands the versatility of the methodology. The carbon fiber's high surface area and pore structure provide an effective medium for capturing $CO_2$ molecules, contributing to greenhouse gas reduction. This versatility positions the invention as a valuable solution for industries aiming to implement carbon capture technologies.
e. Optimized Brine Treatment Method—The developed method for brine treatment, involving the passage of $CO_2$ gas through a mixture of brine and modified recycled carbon fibers, is systematically optimized. By investigating key variables such as contact time, flow rate, and brine concentration, the methodology ensures the effectiveness of brine treatment while minimizing operational complexities. While atmospheric pressure is utilized in this instance, alternative pressures may also be applied. As for the time variable, it is influenced by other operational conditions and is determined when the final concentration of the effluent gas leaving the G-S-L system equals the initial concentration of the feed gas in the system. In simpler terms, it occurs once the brine and carbon fiber become saturated with $CO_2$. The optimized approach enhances the overall performance and reliability of the brine treatment process. The incorporation of modified recycled carbon fibers in brine treatment enhances adsorption efficiency and selectivity. This efficiency leads to effective removal of impurities from brine water generated by desalination processes. The optimized brine treatment method ensures a reliable and robust process for managing brine disposal, addressing a significant environmental concern associated with desalination.
f. Contribution to Circular Economy—The research contributes to the principles of a circular economy by closing the loop on carbon fiber waste. The recycling process, combined with effective brine treatment and $CO_2$ capture, aligns with the sustainable ethos of reusing materials, reducing environmental impact, and promoting a more circular and regenerative industrial system. The methodology contributes to the principles of a circular economy by recycling carbon fiber waste. This closed-loop approach aligns with sustainability goals, promoting responsible resource management and reducing the environmental impact of industrial processes. It exemplifies a holistic strategy towards achieving a circular and regenerative industrial system.
g. Environmental Sustainability—The primary advantage of the proposed methodology lies in its commitment to environmental sustainability. By recycling carbon fibers through the pyrolysis process, the invention contributes to minimizing carbon footprint and reducing dependence on virgin carbon fiber production. This aligns with global efforts towards sustainable practices and resource conservation.
h. Cost-Effective Carbon Fiber Utilization—The utilization of recycled carbon fibers offers a cost-effective alternative to traditional carbon fiber production. The recycling process reduces the need for raw materials, making it an economically viable solution. This cost efficiency makes the methodology attractive for industries seeking sustainable yet economical materials for various applications.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A system for utilizing carbon fibers for purification of brine solution, the system comprising:
   a furnace providing a controlled environment for thermally treating and recycling the carbon fibers;
   a means for surface activation of the recycled carbon fibers; and
   a means for exposing a mixture of the brine and the activated recycled carbon fibers to $CO_2$ gas,
   wherein exposing the activated recycled carbon fibers along with the brine solution to $CO_2$ gas, results in the surface activated recycled carbon fibers selectively recovering contaminants or salts from the brine solution, along with $CO_2$ molecules being adsorbed by the activated recycled carbon fibers during the recovery of the contaminants or salts from the brine solution.

2. The system of claim 1, wherein the furnace is a tube furnace for thermally recycling of the carbon fibers via pyrolysis.

3. The system of claim 1, which comprises liquid nitrogen and a cryogenic ball mill for activating the recycled carbon fibers mechanically by grinding the carbon fibers into a finely ground texture after immersing in the liquid nitrogen.

4. The system of claim 3, which comprises a hydroxide solution for chemically activating the mechanically activated carbon fibers.

5. The system of claim 1, which comprises a bubbling (G-S-L) contact system for exposing the activated recycled carbon fibers along with the brine solution to $CO_2$ gas at varying flow rates and contact times.

\* \* \* \* \*